US011212877B2

(12) United States Patent
Oda et al.

(10) Patent No.: US 11,212,877 B2
(45) Date of Patent: Dec. 28, 2021

(54) RELAYING DEVICE, METHOD OF RELAYING COMMUNICATION PACKET AND VOICE COMMUNICATION SYSTEM

(71) Applicant: ICOM INCORPORATED, Osaka (JP)

(72) Inventors: Yuma Oda, Osaka (JP); Yoshiaki Miyakoshi, Osaka (JP)

(73) Assignee: ICOM INCORPORATED, Osaka (JP)

( * ) Notice: Subject to any disclaimer, the term of this patent is extended or adjusted under 35 U.S.C. 154(b) by 0 days.

(21) Appl. No.: 15/738,119

(22) PCT Filed: Jun. 30, 2016

(86) PCT No.: PCT/JP2016/069411
§ 371 (c)(1),
(2) Date: Dec. 19, 2017

(87) PCT Pub. No.: WO2017/006833
PCT Pub. Date: Jan. 12, 2017

(65) Prior Publication Data
US 2018/0176987 A1 Jun. 21, 2018

(30) Foreign Application Priority Data

Jul. 6, 2015 (JP) .............................. JP2015-135701

(51) Int. Cl.
*H04L 12/28* (2006.01)
*H04W 88/16* (2009.01)
(Continued)

(52) U.S. Cl.
CPC ............. *H04W 88/16* (2013.01); *H04L 12/66* (2013.01); *H04L 65/103* (2013.01);
(Continued)

(58) Field of Classification Search
USPC ....... 370/229, 230, 278, 279, 293, 315, 349, 370/389, 392, 466, 475, 492, 501
See application file for complete search history.

(56) References Cited

U.S. PATENT DOCUMENTS 6,888,837 B1 * 5/2005 Cunningham .... H04L 29/12066
370/389
7,966,404 B2 * 6/2011 Hedin ..................... H04L 29/06
709/227
(Continued)

FOREIGN PATENT DOCUMENTS

JP 3052826 B2 6/2000
WO 2009/125470 A1 10/2009
(Continued)

OTHER PUBLICATIONS

International Search Report of PCT/JP2016/069411.

*Primary Examiner* — Nguyen H Ngo
(74) *Attorney, Agent, or Firm* — Muncy, Geissler, Olds & Lowe, P.C.

(57) ABSTRACT

[Problem] To achieve a voice communication system which communicates between two networks that use partially overlapping address spaces.
[Solution] According to the present invention, first and second networks are connected to one another by means of a gateway device provided with: a first protocol stack which manages transmission and reception addresses of communication packets in the first network; a second protocol stack which manages transmission and reception addresses of communication packets in the second network; and a call control unit which, upon reception of a communication packet from either network, determines the transfer desti-
(Continued)

nation network and transfer destination address of the packet on the basis of call destination information included in the packet.

12 Claims, 9 Drawing Sheets

(51) Int. Cl.
    *H04L 12/66*     (2006.01)
    *H04M 3/56*     (2006.01)
    *H04L 29/06*     (2006.01)
    *H04W 8/24*     (2009.01)
    *H04W 88/04*     (2009.01)
    *H04L 12/741*     (2013.01)

(52) U.S. Cl.
    CPC ........... *H04M 3/561* (2013.01); *H04M 3/562* (2013.01); *H04M 3/568* (2013.01); *H04W 8/24* (2013.01); *H04W 88/04* (2013.01); *H04L 45/74* (2013.01); *H04L 69/08* (2013.01)

(56) References Cited

U.S. PATENT DOCUMENTS

| | | | |
|---|---|---|---|
| 9,485,196 B1* | 11/2016 | Sankaran | H04L 49/15 |
| 2004/0028009 A1* | 2/2004 | Dorenbosch | H04W 36/0011 370/329 |
| 2007/0160034 A1* | 7/2007 | Koretsky | H04L 29/06027 370/352 |
| 2008/0046542 A1* | 2/2008 | Sano | H04W 36/14 709/218 |
| 2009/0282123 A1* | 11/2009 | Fornari | H04L 12/1836 709/207 |
| 2011/0026537 A1* | 2/2011 | Kolhi | H04L 12/4633 370/401 |
| 2012/0023257 A1* | 1/2012 | Vos | H04L 61/2582 709/232 |
| 2012/0076047 A1* | 3/2012 | Turanyi | H04W 76/10 370/254 |
| 2012/0076131 A1 | 3/2012 | Bianconi | |
| 2014/0341109 A1* | 11/2014 | Cartmell | H04L 45/308 370/328 |
| 2015/0350069 A1* | 12/2015 | Padgett | H04L 45/72 370/236 |
| 2016/0057566 A1* | 2/2016 | Koshimizu | H04L 61/106 370/315 |
| 2016/0072764 A1* | 3/2016 | Arshinov | H04L 61/1511 709/245 |
| 2016/0080260 A1* | 3/2016 | Wang | H04L 67/025 370/392 |
| 2016/0212696 A1* | 7/2016 | Tu | H04W 28/08 |

FOREIGN PATENT DOCUMENTS

| | | |
|---|---|---|
| WO | 2015/068665 A1 | 5/2015 |
| WO | 2015068663 A1 | 5/2015 |

* cited by examiner

| DESTINATION | | TRANSMISSION SOURCE | | DATA BODY | | | |
|---|---|---|---|---|---|---|---|
| | | | | | COMMUNICATION CONTROL INFORMATION | | |
| IP ADDRESS | PORT NUMBER | IP ADDRESS | PORT NUMBER | VOICE DATA | CALL TYPE | CALL DESTINATION ID | TRANSMISSION SOURCE ID |

| CALL TYPE | CALL DESTINATION ID | BELONGING TERMINAL INFORMATION | LAN-SIDE ANOTHER BASE INFORMATION | LTE-SIDE ANOTHER BASE INFORMATION |
|---|---|---|---|---|
| INDIVIDUAL | 001 | - | S1 | - |
| INDIVIDUAL | 011 | - | S2 | - |
| INDIVIDUAL | 021 | - | - | LS |
| INDIVIDUAL | 022 | - | - | LS |
| GROUP | 101 | (001,011) | S1, S2 | - |

Fig. 5

| CALL TYPE | CALL DESTINATION ID | BELONGING TERMINAL INFORMATION | ANOTHER BASE INFORMATION |
|---|---|---|---|
| INDIVIDUAL | 001 | - | G |
| INDIVIDUAL | 011 | - | G |
| INDIVIDUAL | 021 | 021 | - |
| INDIVIDUAL | 022 | 022 | - |
| GROUP | 101 | - | G |

Fig. 6

| CALL TYPE | CALL DESTINATION ID | BELONGING TERMINAL INFORMATION | ANOTHER BASE INFORMATION |
|---|---|---|---|
| INDIVIDUAL | 001 | 001 | - |
| INDIVIDUAL | 011 | - | G |
| INDIVIDUAL | 021 | - | G |
| INDIVIDUAL | 022 | - | G |
| GROUP | 101 | 001 | G |

Fig. 7

| CALL TYPE | CALL DESTINATION ID | BELONGING TERMINAL INFORMATION | ANOTHER BASE INFORMATION |
|---|---|---|---|
| INDIVIDUAL | 001 | - | G |
| INDIVIDUAL | 011 | 011 | - |
| INDIVIDUAL | 021 | - | G |
| INDIVIDUAL | 022 | - | G |
| GROUP | 101 | 011 | G |

Fig. 8

| G | CALL TYPE | CALL DESTINATION ID | BELONGING TERMINAL INFORMATION | LAN-SIDE ANOTHER BASE INFORMATION | LTE-SIDE ANOTHER BASE INFORMATION |
|---|---|---|---|---|---|
| | GROUP | 102 | - | S1 | LS |

| S1(M) | CALL TYPE | CALL DESTINATION ID | BELONGING TERMINAL INFORMATION | ANOTHER BASE INFORMATION |
|---|---|---|---|---|
| | GROUP | 102 | 001,(011,021) | S2,G |

| S2 | CALL TYPE | CALL DESTINATION ID | BELONGING TERMINAL INFORMATION | ANOTHER BASE INFORMATION |
|---|---|---|---|---|
| | GROUP | 102 | 011 | S1 |

| LS | CALL TYPE | CALL DESTINATION ID | BELONGING TERMINAL INFORMATION | ANOTHER BASE INFORMATION |
|---|---|---|---|---|
| | GROUP | 102 | 021 | G |

Fig. 12

RELAYING DEVICE, METHOD OF RELAYING COMMUNICATION PACKET AND VOICE COMMUNICATION SYSTEM

TECHNICAL FIELD

The present invention relates to a voice communication system using a network and particularly to a technology for relaying voice communication connected to a plurality of networks.

BACKGROUND ART

A LAN transceiver system for performing communication using a local area network (LAN) with an operation feeling similar to that of a conventional handy transceiver has been put into practice (Patent Literature 1, for example). This system is a system for transferring a voice signal by using a 1-segment LAN, and effective private address for each LAN is assigned to each apparatus.

CITATION LIST

Patent Literature

[Patent Literature 1] International Publication WO/2015/068663

PROBLEM TO BE SOLVED BY INVENTION

Even in the aforementioned voice communication system using the LAN, a system needs to be constructed by connecting a different network in order to widen a communication range in some cases. The LAN transceiver system is constructed as a system on the LAN using a private address. In the Internet protocol (IP), since the private address has specified address range, it is likely that address spaces of the connected two networks are overlapped, and private addresses of apparatuses present on each of the networks are duplicated. In such a case, it is only necessary to change addresses of apparatuses on either one of the networks so as to avoid duplication, but address management is extremely cumbersome. A NAT router can be provided in each of the networks for conversion of the addresses so that the two networks can be mutually connected, but the NAT router is required for each of the networks, which makes configuration complicated, and setting is cumbersome.

An object of the present invention is to realize a voice communication system conducting communication between two networks using overlapped address spaces.

SUMMARY OF THE INVENTION

The present invention is a gateway device for connecting a first network and a second network each having an address space at least partially overlapped with each other, characterized by including: a first protocol stack for managing a transmission/reception address of a communication packet on the first network; a second protocol stack for managing a transmission/reception address of a communication packet on the second network; and a call control unit for determining, when the communication packet is received from either one of the networks, a re-transmission destination network and a re-transmission destination address of a payload included in the packet on the basis of call destination information included in the packet.

The present invention is a gateway device for connecting a first network and a second network each having an address space at least partially overlapped with each other, characterized by including: a first interface connected to the first network; a second interface connected to the second network; and a call control unit comprising a call destination table including identification information of terminals present on the first and second networks and the call destination table associated with addresses for transmitting a packet to the terminals, and determining, when a communication packet is received from either one of the interfaces, a re-transmission destination network and a re-transmission destination address of a payload included in the packet on the basis of call destination information including identification information included in the packet.

In the aforementioned invention, the first and second networks may be a local area network and a mobile phone network.

In the aforementioned invention, to the first network and to the second network, one or a plurality of servers are connected, respectively, and each of the servers may transmit/receive a voice signal to/from one or a plurality of subordinate communication terminals. The call control unit sets this gateway device to a master mode or a slave mode and operates the gateway device independently with respect to each of the first network and the second network. In the master mode, all the voice signals received by the server are integrated, and this voice signal is delivered to each of the servers by using the communication packet. In the slave mode, the voice signal received from the subordinate communication terminal is transmitted toward a device in the master mode (master server) by using the communication packet and also transmits a voice signal received from the master server to the subordinate communication terminal. The call control unit transfers the voice signal received from the server in the master mode to the other server except for the server, transmits the voice signal received from the master server in the slave mode to the server on the network on a side opposite to that of the master server and also transmits the voice signal received from the server of the network on the opposite side to the master server.

The present invention is a method of relaying a communication packet between a first network and a second network each having an address space at least partially overlapped with each other, characterized by having: a procedure of receiving a communication packet from the first network using a first protocol stack managing a transmission/reception address of the communication packet on the first network; a procedure of determining a re-transmission destination address of a payload included in the packet on the basis of call destination information included in the received communication packet; a procedure of generating a packet having the determined re-transmission destination address and including the payload; and a procedure of transmitting the generated packet to the second network using a second protocol stack managing the transmission/reception address of the communication packet on the second network.

The present invention is a method of relaying a communication packet between a first network and a second network each having an address space at least partially overlapped with each other, characterized by having: a procedure of receiving a communication packet from a first interface connected to the first network; a procedure of determining a re-transmission destination address of a payload included in the packet by referring to identification information of terminals present on the first and second networks, and a call destination table associated with addresses for transmitting a packet to the terminals by means of call destination information included in the received communication packet; a procedure of generating a packet having the determined re-transmission destination address and including the payload; and a procedure of transmitting the generated packet from the second interface connected to the second network.

A voice communication system of the present invention is characterized by including: a first server connected to a first network and transmitting/receiving a voice signal to/from a first communication terminal; a second server connected to a second network having an address space at least partially overlapped with that of the first network and transmitting/receiving a voice signal to/from a second communication terminal; and the gateway device.

A voice communication system of the present invention includes: one or a plurality of servers connected to a first network; one or a plurality of servers connected to a second network having an address space at least partially overlapped with that of the first network; and the gateway device operating in a master mode with respect to both of the first and second networks. Each of the servers transmits/receives a voice signal to/from one or a plurality of subordinate communication terminals. The server transmits the voice signal received from the subordinate communication terminal to the gateway device and transmits a voice signal received from the gateway device to the subordinate communication terminal. The gateway device transfers the voice signal received from the server to the other server except for the server.

A voice communication system of the present invention includes: one or a plurality of servers connected to a first network; one or a plurality of servers connected to a second network having an address space at least partially overlapped with that of the first network; and the gateway device operating in a slave mode with respect to the first network and in a master mode with respect to the second network. One of the servers of the first network is set as a first master server, while the other server of the first network is set as a first slave server, and the server of the second network is set as a second slave server. The first master server integrates all the voice signals received by the first slave servers and delivers this voice signal to the first slave servers and the gateway device by using a communication packet. The first slave server transmits the voice signal received from the subordinate communication terminal to the first master server using the communication packet and transmits the voice signal received from the first master server to the subordinate communication terminals except for the communication terminal. The second slave server transmits the voice signal received from the subordinate communication terminal to the gateway device by using the communication packet, transfers it to the subordinate communication terminals except for the communication terminal and transfers the voice signal received from the gateway device to the subordinate communication terminal. The gateway device transmits the voice signal received from the first master server to the second slave server and transmits the voice signal received from the second slave server to the second slave server except for the slave server and the first master server.

A voice communication system of the present invention includes: one or a plurality of servers in a slave mode connected to a first network; one or a plurality of servers in the slave mode connected to a second network having an address space at least partially overlapped with that of the first network; and the gateway device operating in a master mode, and each of the servers transmits/receives a voice signal to/from one or a plurality of subordinate communication terminals. In group communication within a group to which two or more communication terminals belong, the belonging communication terminals communicate with each other, the server and the gateway device operate as follows. The server transfers the voice signal received from the subordinate communication terminal to the subordinate communication terminal belonging to the group except for the communication terminal and the gateway device and transfers the voice signal received from the gateway device to the subordinate communication terminal belonging to the group. The gateway device transmits the voice signal received from the server to the server managing the communication terminal belonging to the group except for the server.

A voice communication system of the present invention includes: one or a plurality of servers connected to a first network; one or a plurality of servers connected to a second network having an address space at least partially overlapped with that of the first network; and the gateway device operating in a slave mode, and each of the servers transmits/receives a voice signal to/from one or a plurality of subordinate communication terminals. One of the servers of the first network is set as a first master server, while the other server of the first network is set as a first slave server. The server of the second network is set as a second slave server. The gateway device is set to the slave mode with respect to the first network and is set to a master mode with respect to the second network. In group communication within a group to which two or more communication terminals belong, the belonging communication terminals communicate with each other, each server and the gateway device operate as follows.

The first slave server transfers the voice signal received from the subordinate communication terminal to the subordinate communication terminal belonging to the group except for the communication terminal and the first master server. The first slave server transfers the voice signal received from the first master server to the subordinate communication terminals belonging to the group.

The first master server transfers the voice signal received from the subordinate communication terminal to the subordinate communication terminal belonging to the group except for the communication terminal and to the first slave server managing the communication terminal belonging to the group. The first master server transfers the voice signal received from the first slave server to the first slave server managing the communication terminal belonging to the group except the slave server and to the subordinate communication terminal belonging to the group. The first master server transmits the voice signal to the gateway device when the communication terminal belonging to the group is on the second network.

The second slave server transfers the voice signal received from the subordinate communication terminal to the subordinate communication terminal belonging to the group except for the communication terminal and to the gateway device. The second slave server transfers the voice signal received from the gateway device to the subordinate communication terminal belonging to the group.

The gateway device transmits the voice signal received from the first master server to the second slave server managing the communication terminal belonging to the group. The gateway device transmits the voice signal received from the second slave server to the second slave server managing the communication terminal belonging to the group except for the slave server and to the first master server.

A voice communication system of the present invention includes: one or a plurality of servers connected to a first network; one or a plurality of servers connected to a second network having an address space at least partially overlapped with that of the first network; and the gateway device operating in a slave mode, and each of the server transmits/receives a voice signal to/from one or a plurality of subordinate communication terminals. One of the servers of the first network is set as a first master server, while the other server of the first network is set as a first slave server. One of the servers of the second network is set as a second master server, while the other server of the second network is set as a second slave server. In group communication within a group to which two or more communication terminals belong, the belonging communication terminals communicate with each other, each server and the gateway device operate as follows.

The first slave server transfers the voice signal received from the subordinate communication terminal to the subordinate communication terminal belonging to the group except the communication terminal and to the first master server. The first slave server transfers a voice signal received from the first master server to the subordinate communication terminal belonging to the group.

The first master server transfers the voice signal received from the subordinate communication terminal to the subordinate communication terminal belonging to the group except for the communication terminal and to the first slave server managing the communication terminal belonging to the group. The first master server transfers the voice signal received from the first slave server to the first slave server managing the communication terminal belonging to the group except the first slave server and to the subordinate communication terminal belonging to the group. The first master server transmits the voice signal to be transmitted to the gateway device when the communication terminal belonging to the group is on the second network.

The second slave server transfers the voice signal received from the subordinate communication terminal to the subordinate communication terminal belonging to the group except for the communication terminal and to the second master server. The second slave server transfers a voice signal received from the second master server to the subordinate communication terminal belonging to the group.

The second master server transfers the voice signal received from the subordinate communication terminal to the subordinate communication terminal belonging to the group except for the communication terminal and to the second slave server managing the communication terminal belonging to the group. The second master server transfers the voice signal received from the second slave server to the second slave server managing the communication terminal belonging to the group except for the second slave server and to the subordinate communication terminal belonging to the group. The second master server transmits the voice signal to be transmitted to the gateway device when the communication terminal belonging to the group is on the first network.

The gateway device transmits the voice signal received from the first master server to the second master server and transmits the voice signal received from the second master server to the first master server.

ADVANTAGEOUS EFFECT OF INVENTION

According to the present invention, voice communication beyond networks is enabled by connecting the two networks whose address spaces are overlapped with each other.

BRIEF DESCRIPTION OF THE DRAWINGS

FIG. 5 is a diagram illustrating a call destination table provided in the gateway.

FIG. 6 is a diagram illustrating the call destination table provided in the LTE server.

FIG. 7 is a diagram illustrating the call destination table provided in the LAN server (S1).

FIG. 8 is a diagram illustrating the call destination table provided in the LAN server (S2).

FIG. 12 is a diagram illustrating an example of the call destination table of each server.

DETAILED DESCRIPTION OF THE EMBODIMENT

Figure 1:
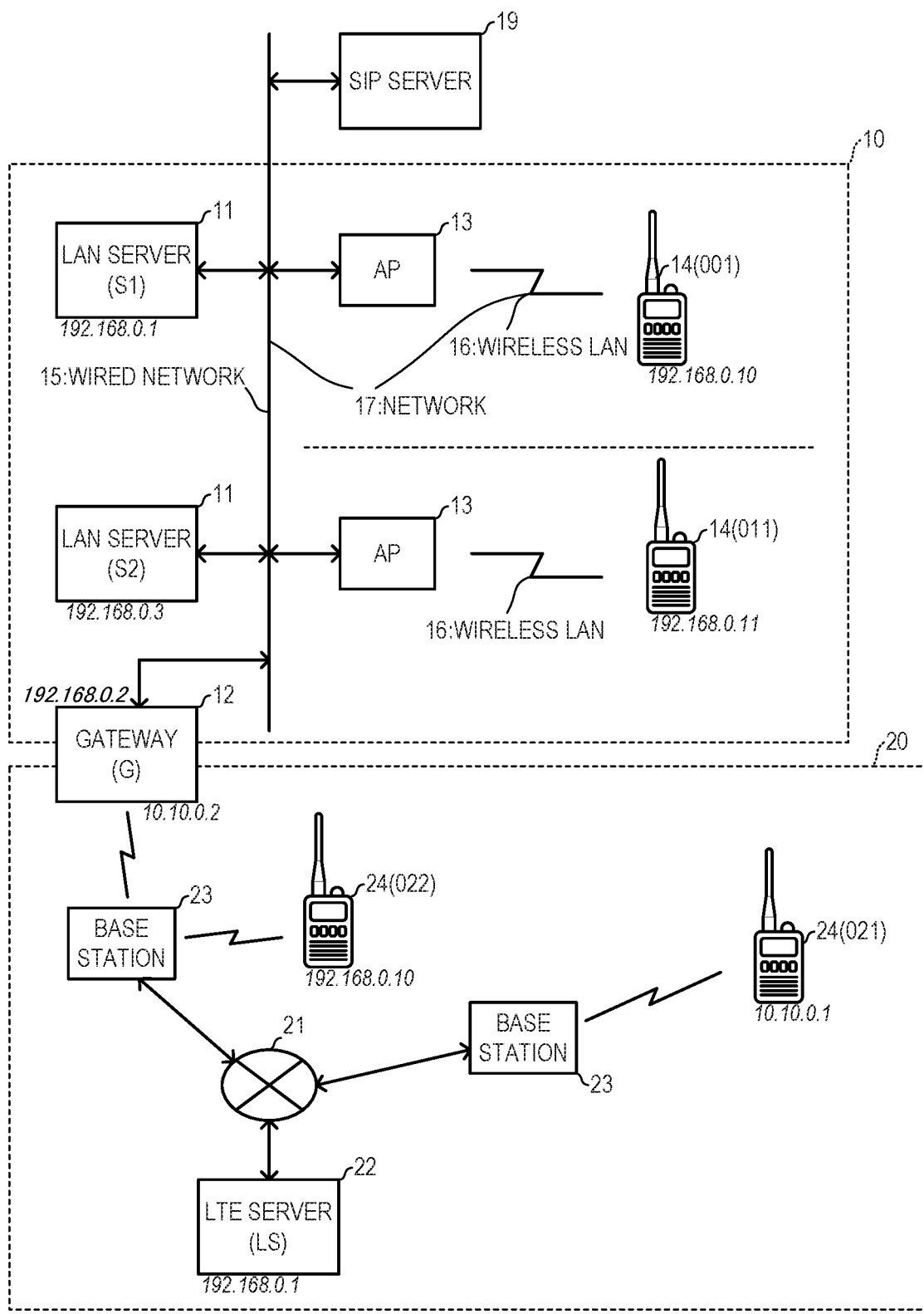
FIG. 1 is a configuration diagram of an audio communication system which is an embodiment of the present invention.

A voice communication system of the present invention will be described by referring to the attached drawings. FIG. 1 is a configuration diagram of a voice communication system which is an embodiment of the present invention. This voice communication system is made by connecting a LAN-side system 10 using a wireless LAN 16 such as Wi-Fi and an LTE-side system 20 using an LTE 21 which is a communication network of a mobile phone via a gateway 12, and communication terminals 14 and 24 belonging to the respective systems conduct voice communication with each other.

The LAN-side system 10 has a LAN server 11 and the LAN communication terminal 14. The LAN communication terminal 14 and the LTE communication terminal 24 have substantially similar configuration and have a similar shape to a handy transceiver for wireless communication, both including a PTT (push-to-talk) switch, but they are wireless network apparatuses transmitting/receiving a voice signal via a wireless access point (AP) 13 or a base station 23 in terms of functions. The LAN server 11 and the LTE server 22 which are relaying devices relay mutual communication between the LAN communication terminal 14 and the LTE communication terminal 24. Hereinafter, a wired network 15 and the wireless LAN 16 on the LAN-side system 10 are collectively called a network 17, and a network on the LTE-side system 20 is called an LTE network 21. To the wireless LAN 16, a communication scheme conforming to IEEE 802.11 such as Wi-Fi can be applied.

In FIG. 1, two servers 11, a gateway 12, and an SIP server 19 are connected to the wired network 15. On both of the LAN-side system 10 and the LTE-side system 20, the gateway 12 functions as a master server controlling a transfer destination of the voice signal. Here, the transfer of the voice signal is processing of transmitting the voice signal included as a payload in the received voice packet by including it in a voice packet according to the network of a transmission destination. When a plurality of the voice packets is received and a plurality of the voice signals which are their payloads are to be transmitted to the same transmission destination, a signal obtained by mixing these voice signals is included as a payload in the voice packet to be transmitted. Then, the two servers 11 function as a slave server S1 and a slave server S2 which transfer the voice signal transferred from the gateway 12 which is the master server to the LAN communication terminal 14. The slave server S1 communicates with the LAN communication terminal 14 with a terminal ID of 001 via the wireless access point 13 and manages this LAN communication terminal 14 as a subordinate terminal. The slave server S2 communicates with the LAN communication terminal 14 with a terminal ID of 011 via the wireless access point 13 and manages this LAN communication terminal 14 as a subordinate terminal.

In this embodiment, the gateway 12 is set up as the master server to both of the LAN-side system 10 and the LTE-side system 20, but the LAN server 11 and/or the LTE server 22 may be set up as the master server. When the servers 11 and 22 are set up as the master servers, the gateway 12 operates in a slave mode (as a slave server) with respect to the systems 10 and 20 on that side. On the LAN-side system 10, the number of the LAN servers 11 is not limited to two but may be one or three or more. Moreover, when a system to which three or more segments are connected is to be configured, there may be two or more gateways 12.

On the other hand, on the LTE-side system 20, the LTE server 22 communicates with the LTE communication terminals 24 with terminal IDs of 021 and 022 via the LTE network 21 and manages these LTE communication terminals 24 as subordinate terminals.

As illustrated in FIG. 1, to each of the apparatuses in the LAN-side system 10 and the LTE-side system 20, a private IP address of the network 17 and a private IP address of the LTE network 21 are given. Their address spaces are at least partially overlapped with each other, and some of the apparatuses of the both systems 10 and 20 have the same IP addresses.

Figure 2:
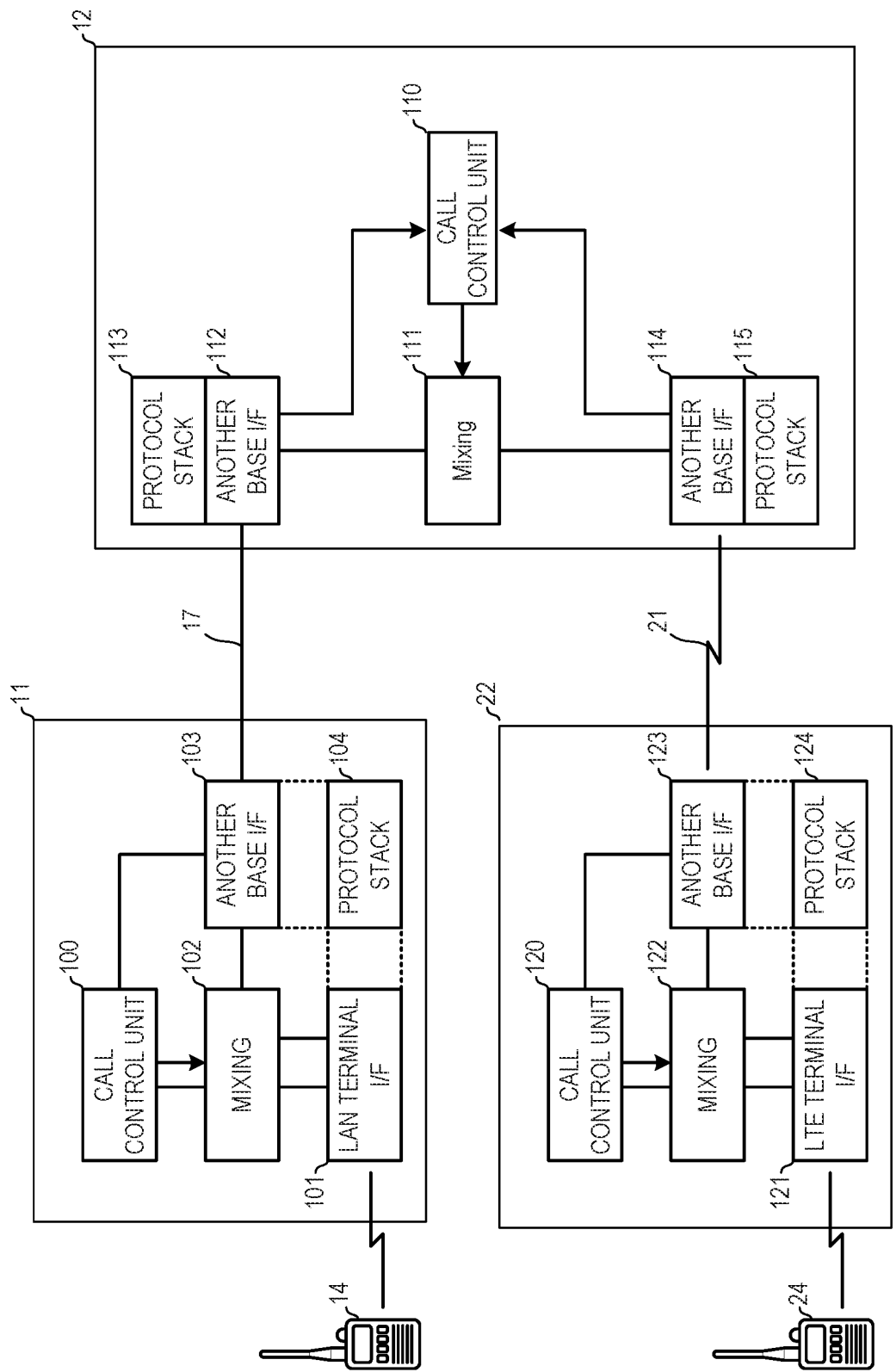
FIG. 2 is a functional block diagram of a gateway, a LAN server, and an LTE server.

FIG. 2 is a functional block diagram of the LAN server 11, the gateway 12, and the LTE server 22. The LAN server 11 has a call control unit 100, a LAN terminal interface 101, a mixer 102, and an another base interface 103. The call control unit 100 controls a transfer destination of a voice signal included in a voice packet on the basis of communication control information of the received packet. When a plurality of the voice signals is to be transmitted to the same destination, an instruction is given to the mixer 102 to mix those voice signals. The LAN terminal interface 101 is an interface for communicating with the LAN communication terminal 14. The another base interface 103 is an interface for communicating with the gateway 12 and the other LAN servers 11. In the LAN terminal interface 101 and the another base interface 103, a physical layer including the network 17 and a protocol stack 104 are used in common. The protocol stack 104 has an application for performing direct transfer of a voice signal not using an SIP procedure.

The LTE server 22 also has a call control unit 120, an LTE terminal interface 121, a mixer 122, and an another base interface 123. The LTE terminal interface 121 is an interface for communicating with the LTE communication terminal 24. The another base interface 123 is an interface for communicating with the gateway 12. The call control unit 120 controls a transfer destination of a voice signal included in a voice packet based on communication control information of the received packet. When a plurality of the voice signals is to be transmitted to the same destination, an instruction is given to the mixer 122 to mix those voice signals. In the LTE terminal interface 121 and the another base interface 123, a physical layer including the LTE network 21 and a protocol stack 124 are used in common. The protocol stack 124 has an application for performing direct transfer of a voice signal not using TCP/IP on the LTE network 21 and the SIP procedure.

The gateway 12 connects the LAN server 11 (LAN-side system 10) and the LTE server 22 (LTE-side system 20). The gateway 12 has a (LAN-side) another base interface 112 for communicating with the LAN server 11, an (LTE-side) another base interface 114 for communicating with the LTE server 22, a call control unit 110, and a mixer 111. The another base interface 112 on the LAN side has a protocol stack 113 for communicating with the LAN server 11 via the network 17. This protocol stack 113 is substantially similar to the protocol stack 104 of the LAN server 11. The another base interface 114 on the LTE side has a protocol stack 115 for communicating with the LTE server 22 via the LTE network 21. This protocol stack 115 is substantially similar to the protocol stack 124 of the LTE server 22. The voice signals included in the voice packets input from the another base interfaces 112 and 114 are mixed in the mixer 111 and re-edited to a voice packet to be transmitted from the another base interface on the opposite side or the another base interface on the same side. To which of the another base interfaces, that is, to which server the voice signal is to be transferred is determined by the call control unit 110 on the basis of communication control information included in the received voice packet. The another base interface 114 on the LTE side is a wireless (LTE) interface using a communication channel in common with the mobile phone.

The call control unit 110 of the gateway 12 is realized by cooperation between a computer and a communication application program. The communication application program includes a program for determining an interface of the server to be called and a server program for communicating with the LTE server 22 and the LAN server 11.

Configuration of a voice packet used in this voice communication system will be described by referring to FIG. 3. The voice packet has header information including a destination IP address, a destination port number, a transmission source IP address, and a transmission source port number and a data body (payload) including voice data and communication control information. The voice data is a voice signal for 1 thread (20 milliseconds, for example) obtained by digitalization and compression. The destination IP address and the transmission source IP address are IP addresses indicating a direct destination and direct transmission source of this voice packet. The communication control information is information for identifying a communication session indicating which communication terminal is communicating with which communication terminal and includes a call type, a call destination ID, and a transmission source ID. The call type is information indicating a mode of communication and indicating any one of individual communication, group communication or plenary communication. The call destination ID is a terminal number of a communication partner in the case of the individual communication and a group number in the case of the group communication.

When the LTE communication terminal 24 (021) calls the LAN communication terminal 14 (001) to communicate with it, for example, 001 and 021 are described in the call destination ID and the transmission source ID of the communication control information, respectively. The voice signal is transferred in the order of the LTE communication terminal 24 (021),→the LTE server 22→the gateway 12→the LAN server 11 (S1)→the LAN communication terminal 14 (001), and at each transfer, the voice packet including the voice signal is newly edited, and the transmission source IP address and the destination IP address at that time are described. This transfer order indicates an order when the gateway 12 is the master server, but when another LAN server 11 is set as the master server, the gateway 12 first transfers the voice signal to the master server, and the master server transfers the voice signal to the LAN server 11 (S1). However, when the LAN server S1 is the master server, the aforementioned order can be used as it is.

When the gateway 12 and the LAN server 11 receive the voice signal from the LAN communication terminal 14 or another server 11 or 22, they take out the data body from this voice signal, determine the transfer destination of the voice data based on the communication control information, create a new voice signal and transmit it to the transfer destination. At this time, processing of mixing a plurality of pieces of voice data is performed as necessary.

Figures 3, 4:
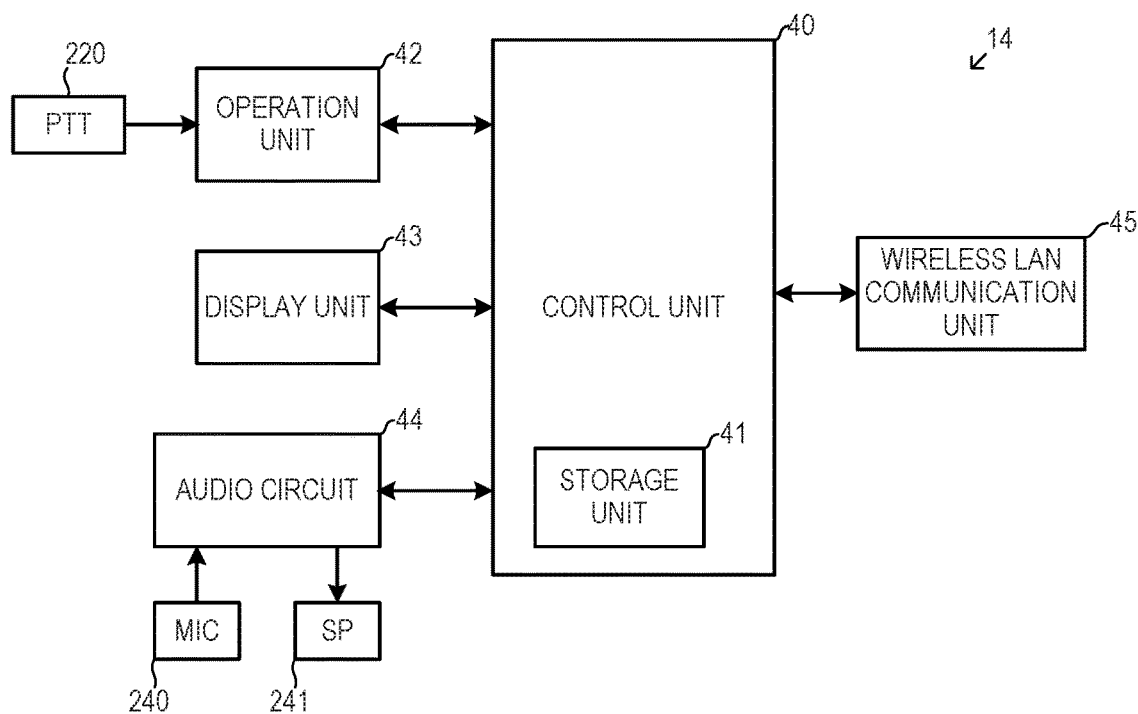
FIG. 3 is a diagram illustrating an example of configuration of a voice packet.
FIG. 4 is a block diagram of a LAN communication terminal.

FIG. 4 is a block diagram of the LAN communication terminal 14. As described above, the LAN communication terminal 14 is a wireless network apparatus for transmitting/receiving a voice signal via the wireless access point (AP) 13 of the wireless LAN in terms of a function. A control unit 40 controlling an operation of the device is constituted by a microprocessor. The control unit 40 has a storage unit 41 in which various types of data is stored. The storage unit 41 stores setting data such as a call destination ID communicable in this communication terminal and the like. To the control unit 40, an operation unit 42, a display unit 43, an audio circuit 44, and a wireless LAN communication unit 45 are connected. The operation unit 42 includes a key switch such as a PTT switch 220 and receives an operation by a user and inputs the operation signal to the control unit 40. The display unit 43 includes a liquid crystal display. On the liquid crystal display, an identification number of a communication partner selected by the operation by the user or an identification number of the communication partner who received the call and the like are displayed.

Moreover, the audio circuit 44 has a microphone 240 and a speaker 241. The control unit 40 decodes the received voice signal and inputs it to the audio circuit 44. The audio circuit converts this decoded audio signal to an analog signal and outputs it from the speaker 241. Moreover, the audio circuit 44 converts the voice signal input from the microphone 240 to a digital signal and inputs it to the control unit 40. The control unit 40 makes this digital audio signal into a voice packet and inputs it to the wireless LAN communication unit 45. The wireless LAN communication unit 45 has a circuit conducting wireless communication in a communication scheme conforming to the aforementioned IEEE 802.11 and transmits the packet input from the control unit 40 toward the wireless access point 13 and also inputs the packet received from the wireless access point 13 to the control unit 40.

In the LAN communication terminal 14 configured as above, when the user inputs voice toward the microphone 240 while pressing the PTT switch 220, the LAN communication terminal 14 edits this voice signal into a voice packet and transmits it to the LAN server 11.

In FIG. 4, the LAN communication terminal 14 is described, but the LTE communication terminal 24 has substantially similar configuration. The LTE communication terminal 24 has an LTE communication unit instead of the wireless LAN communication unit 45.

FIGS. 5, 6, 7, and 8 are diagrams illustrating call destination tables provided in the gateway 12, the LTE server 22, and the LAN server 11 (S1, S2), respectively. When the LTE server 22 and the LAN server 11 receive the voice packet from the subordinate communication terminals 14 and 24, they transfer the voice signal included in this voice packet to the gateway 12 which is the master server. When the gateway 12 receives the voice packet from the servers 11 and 22, it deduces the server which is the transfer destination of the voice signal (payload) included in the voice packet by searching the table in FIG. 5 with the communication type and the call destination ID included in the communication control information of that voice packet and transfers the voice signal to the transfer destination. At this time, the voice packet is edited by the protocol according to the network of the transfer destination, and the voice signal is transferred by using this voice packet. If the LAN server 11 other than the gateway 12 is set as the master server, the voice signal is transferred to the gateway 12 via the master server.

The call destination table includes a call type, a call destination ID, belonging terminal information, and another base information (server information). The call type is information for discriminating individual call/group call/plenary call. The call destination ID is information for identifying the communication terminal 14, 24 or a group of the communication partner. In the case of the individual call, a terminal ID which is the identification information of the communication terminal 14 of the communication destination is the call destination ID. That is, the call destination ID is the same as the terminal information. In the case of the group call, the group number (number starting with 1 in this embodiment) given to the group is the call destination ID. The belonging terminal information and the another base information are information indicating the transfer destination of the voice signal. In the belonging terminal information of the call destination table of the master server (the gateway 12 in this embodiment), the numbers of all the communication terminals belonging to the group including the communication terminal which is not subordinate of its own may be registered.

FIG. 5 illustrates the call destination table of the gateway 12. In the call destination table of the gateway 12, the LAN-side another base information and the LTE-side another base information are stored separately as another base information. Since the gateway 12 does not have a subordinate communication terminal, the belonging terminal information corresponding to all the call destination IDs are blank. The voice signal is transferred to other servers 11 and 22 based on the another base information. Here, the another base information (LS, S1, S2) includes the IP address and the port number of each server. The local IP addresses might be duplicated between the LAN-side system 10 and the LTE-side system 20, but since a storage column in the table and the another base interfaces 112 and 114 including the physical layers are different, they are not confused.

FIGS. 6, 7, and 8 illustrate the call destination tables of the LTE server 22 and the LAN server 11 (S1, S2), respectively. Among the communication terminals called with the call destination ID, the communication terminals subordinate to the server itself have a terminal number described in a field of the belonging terminal number. When the communication terminals not subordinate to itself are called with the call destination ID, the voice signal with the call destination ID is transferred to the gateway 12 which is the master and thus, the IP address and the port number of the gateway 12 are described in the another base information. The another base interface 112 on the LAN-side and the another base interface 114 on the LTE side of the gateway 12 are different from the physical layers (having separate MAC addresses), and independent IP addresses are assigned to them, respectively. Therefore, the another base information of the gateway 12 written in the call destination table (FIG. 6) of the LTE server 22 and the another base information of the gateway 12 written in the call destination table (FIGS. 7 and 8) of the LAN server 11 are information different from each other.

Subsequently, a procedure of transferring the voice signal from the LTE communication terminal 24 of the LTE-side system 20 to the LAN communication terminal 14 of the LAN-side system 10 will be described by referring to FIG. 9.

(Step S101)

The LTE communication terminal 24 (021) transmits a communication packet destined to the LAN communication terminal 14 to the LTE server 22. The transmission source IP address of the communication packet is 10.10.0.1, and the destination IP address is 192.168.0.1.

(Step S102)

The LTE server 22 deduces the destination by referring to the call destination table (FIG. 6) to transmit the communication packet to the gateway 12. The transmission source IP address of the communication packet is 192.168.0.1, and the destination IP address is 10.10.0.2.

(Step S103)

The gateway 12 receives the communication packet coming to the another base interface (LTE interface) 114 (IP address 10.10.0.2) on the LTE side by the LTE protocol stack 115.

(Step S104)

The call control unit 110 (internal communication application) of the gateway 12 refers to the call destination table (FIG. 5) with the communication control information of the received communication packet and determines whether a server is connected to the another base interface (LAN interface) 112 on the LAN side. At this time, a call IP address and a connection destination port number are acquired at the same time.

(Step S105)

The call control unit 110 of the gateway 12 performs communication protocol conversion for the network 17 and gives a transmission instruction to the LAN protocol stack 113.

(Step S106)

The gateway 12 transmits the communication packet from the LAN interface 112 (IP address 192.168.0.2) to the LAN server 11 (S1) by the LAN protocol stack 113. The transmission source IP address of the communication packet is 192.168.0.2 and the destination IP address is 192.168.0.1.

(Step S107)

The LAN server 11 deduces the destination by referring to the internal call destination table (FIG. 7) to transmit the communication packet to the LAN communication terminal 14 (001). The transmission source IP address of the communication packet is 192.168.0.1 and the destination IP address is 192.168.0.10.

(Step S108)

The LAN communication terminal 14 receives the communication packet, and transfer of this communication packet is completed.

Figure 9:
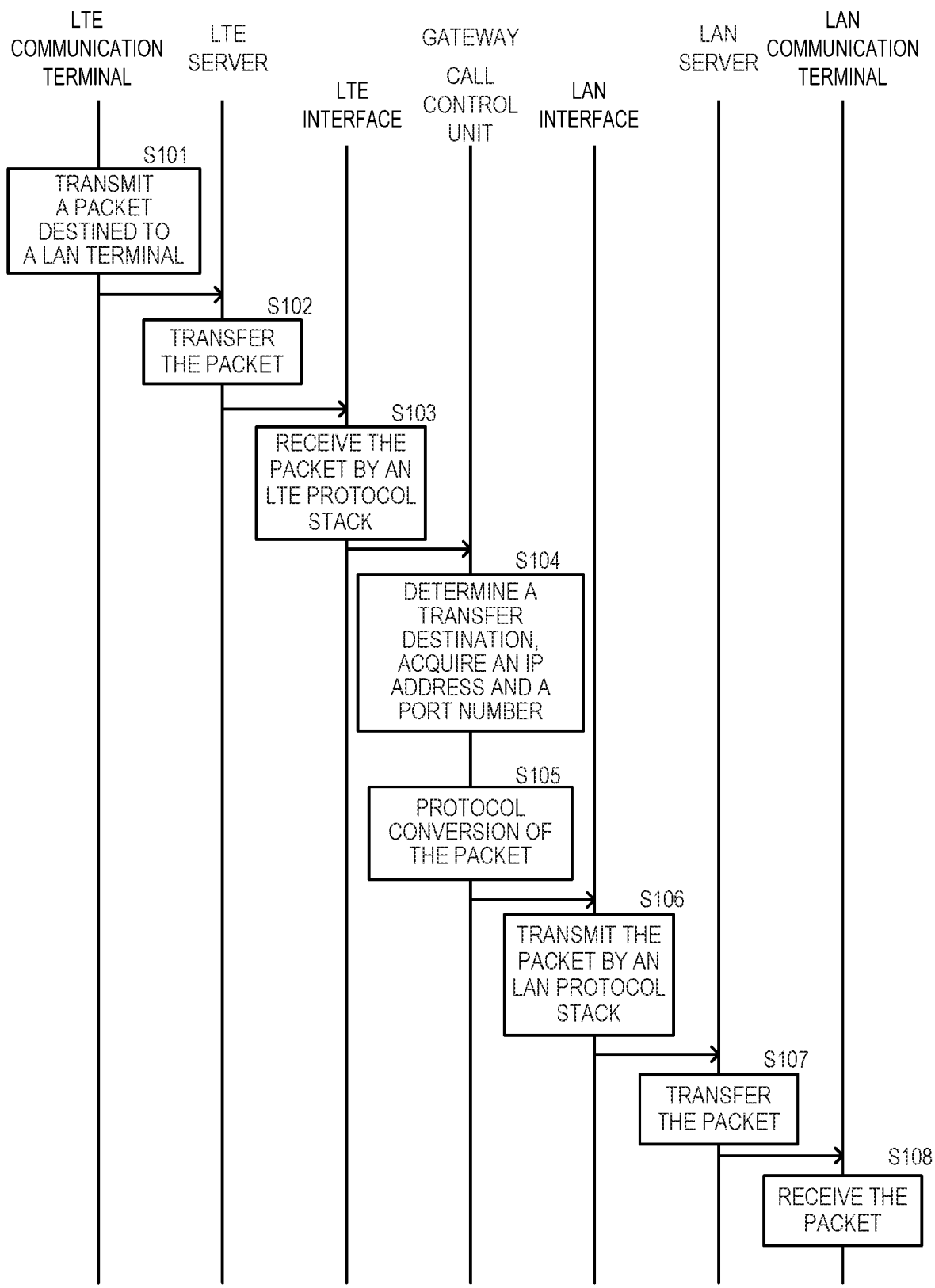
FIG. 9 is a diagram for explaining a transfer procedure of a voice signal.

When the LAN communication terminal 14 transmits a communication packet to the LTE communication terminal 24, communication is conducted in accordance with a procedure opposite to the procedure illustrated in FIG. 9. In this embodiment, the transfer of the voice signal to the opposite side of a reception side via the gateway 12 is described, but depending on the call destination table setting of the gateway 12, it is possible to transmit the communication packet received from the LTE server 22 or the LAN server 11 to both the LTE server 22 and the LAN server 11 or to transfer the communication packet to another server present on a network on the reception side.

Figure 10:
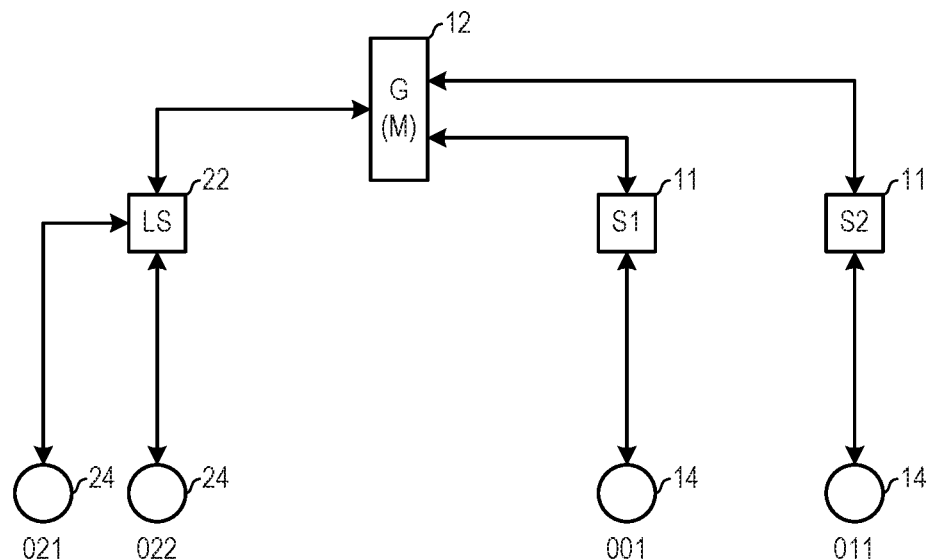
FIG. 10 is a diagram illustrating a flow of the voice signal when the gateway (G) functions as a master server.

In the aforementioned embodiment, the case where the gateway 12 functions as the master server (M) and the other servers (the LAN server 11, the LTE server 22) function as the slave servers is described as an example. A flow of the voice signal in this case is illustrated in FIG. 10. The voice signals of all the communication are collected once to the gateway 12 which is the master server, and the master server determines a reaching point of each of the voice signals to transfer the voice signals to the slave servers. The master server and each of the slave servers mix a plurality of voice signals into one voice signal when they receive those signals so as to transfer it. The numbers of subordinate communication terminals of each server are 2, 0, 1, and 1, respectively, but the number of communication terminals is not limited to them. The gateway 12 may be configured to conduct direct communication with the communication terminal.

Figure 11:
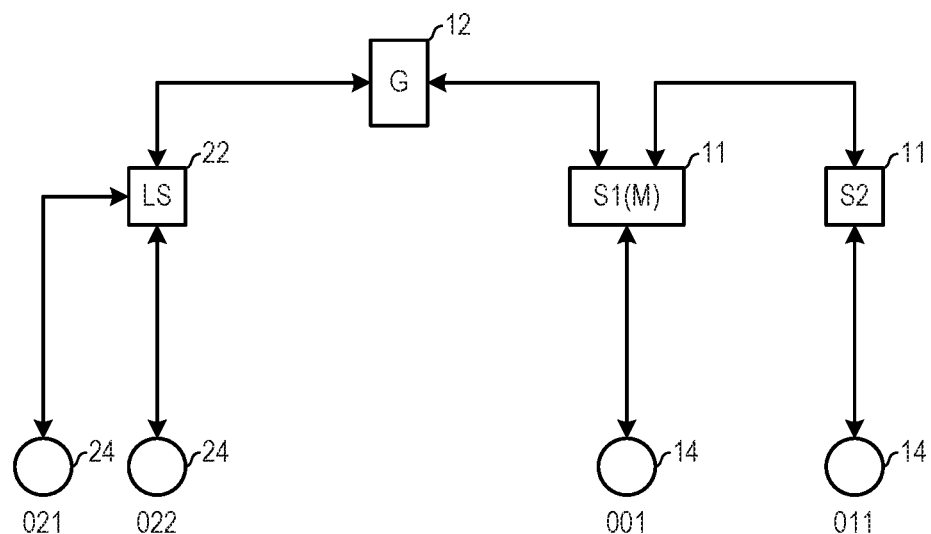
FIG. 11 is a diagram illustrating a flow of the voice signal when the LAN server (S1) functions as the master server.

FIG. 11 is a diagram illustrating a flow of the voice signals when the server other than the gateway 12 (the LAN server 11 (S1) in this example) functions as the master server (M) and the other servers including the gateway 12 function as the slave servers in the LAN-side system 10. The voice signals of all the communication are collected to the LAN server 11 (S1) which is the master server, and the master server determines the reaching point of each of the voice signals to transfer the voice signal to the slave server or the LAN communication terminals 14 subordinate to the master server. The master server and each of the slave servers mix a plurality of voice signals into one voice signal when they receive those signals so as to transfer it. In this case, too, in the LTE-side system 20, the gateway 12 may operate as the master server.

A flow of the voice signals when the group communication is conducted in the system in which the LAN server 11 (S1) is set to function as the master server as described in FIG. 11 will be described. The group communication is a mode of conducting communication mutually by a plurality of (three or more in general) communication terminals at the same time. In this case, transmission/reception of the voice signal is preferably performed in a full-duplex manner.

In each of the servers, that is, the gateway 12, the LTE server 22, and the LAN server 11 (S1, S2), the call destination table is provided as illustrated in FIGS. 5, 6, 7, and 8. When the group communication is conducted, the group is registered in the call destination table of each server. In an example described below, the example in which the group communication is conducted by a group 102 consisting of three communication terminals (001, 011, 021) is shown.

This group 102 is registered in the call destination table of each server as illustrated in FIG. 12. The subordinate belonging communication terminal of the LAN server 11 (S1) which is the master server is only the communication terminal 14 (001), but numbers of all the communication terminals belonging to the group may be registered in the call destination table of the master server.

Figure 13:
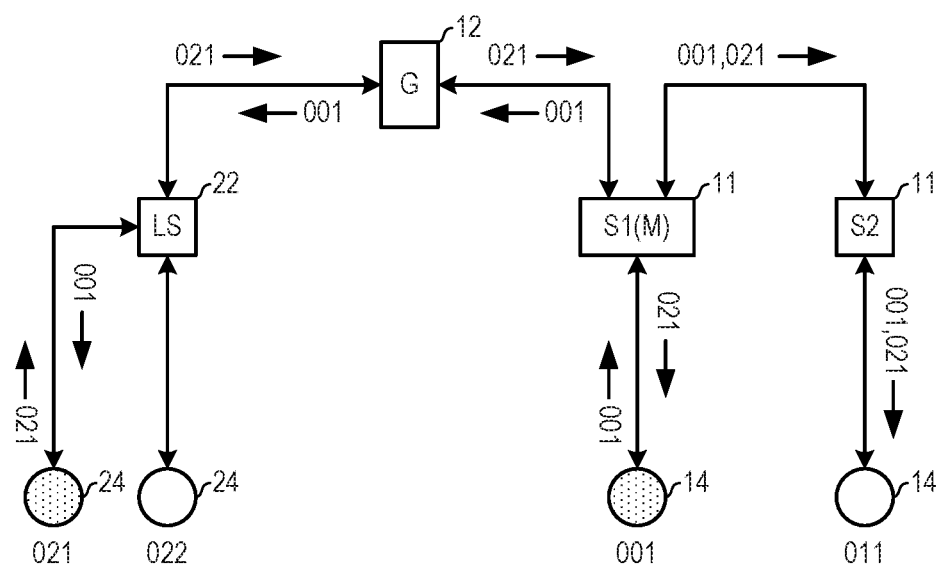
FIG. 13 is a diagram illustrating a flow of the voice signal when group communication is conducted in the voice communication system in which the LAN server (S1) is configured as the master server.

FIG. 13 is a diagram illustrating a flow of the voice signal when the group communication of the group 102 is conducted. In the description of this diagram, the voice signal transmitted from a communication terminal n is referred to as a voice signal n. A voice signal in which a voice signal m and the voice signal n are mixed is referred to as a voice signal m, n. The LAN server 11 (S1) which is the master server is referred to as the master server S1, and the LAN server 11 (S2) which is the slave server is referred to as the slave server S2. This diagram illustrates a state, in plenary communication in the full-duplex, where the terminal 001 and the terminal 021 are talking, that is, transmitting voice signals.

The LTE server 22 (LS) which is the slave server receives a voice signal 021 from the subordinate communication terminal 021. Moreover, it receives a voice signal 001 of the communication terminal 001 transmitted from the master server S1 via the gateway 12(G). The LTE server 22 transfers the voice signal 001 received from the gateway 12 to the communication terminal 021 and transmits the voice signal 021 received from the communication terminal 021 to the gateway 12 in order to deliver it to the master server S1. If this communication is the plenary communication (group communication targeted to all the communication terminals), the LTE server 22 mixes the voice signal 001 and the voice signal 021 so as to transfer the mixed voice signal to the communication terminal 022. As a result, the voice of the communication terminal 001 can be heard on the communication terminal 022. The reason that voice signal 021 is not mixed with the voice signal to be transmitted to the communication terminal 021 is to prevent an echo.

The gateway 12 receives the voice signal 021 from the LTE server 22 and receives the voice signal 001 from the master server S1. The gateway 12 converts the voice signal 021 received from the LTE server 22 to a packet format of the LAN (network 17) to transfer it to the master server S1, and converts the voice signal 001 received from the master server S1 to the packet format of the LTE network 21 to transfer it to the LTE server 22.

The master server S1 receives the voice signal 001 from the subordinate communication terminal 001. Moreover, it receives the voice signal 021 of the communication terminal 021 transmitted from the gateway 12. The master server S1 mixes the received voice signal 001 and voice signal 021 to transmit the mixed voice signal to the slave server S2. Moreover, the master server S1 transmits the voice signal 001 received from the communication terminal 001 to the gateway 12. The voice signal 021 received from the gateway 12 is not included in the voice signal transmitted to the gateway 12. The voice signal 021 received from the gateway 12 is transferred to the communication terminal 001. As a result, the voice of the communication terminal 021 can be heard on the communication terminal 001. The reason that the voice signal 001 is not mixed with the voice signal to be transmitted to the communication terminal 001 is to prevent an echo.

The slave server S2 receives the mixed voice signals 001, 021 from the master server S1 but does not receive the voice signal from the subordinate communication terminal 011 (although it is a terminal belonging to the group). The voice signal 001, 021 received from the master server S1 is transmitted to the subordinate communication terminal 011. As a result, the voices of the communication terminal 001 and the communication terminal 021 can be heard on the communication terminal 011. Since the slave server S2 does not receive the voice signal from the subordinate communication terminal, it transmits nothing to the master server S1.

In the embodiment of FIGS. 11, 12, and 13 described above, two units of the servers (LAN servers 11) are provided on the LAN (network) 17 side, one unit of the server (LTE server 22) is provided on the LTE network 21 side, and one of the LAN servers 11 is made the master server. The number of the servers on the LAN 17 side and the number of the servers on the LTE network 21 side are not limited to them. The number may be any as long as it is one or more. Moreover, the master server is installed on the LAN 17 side but not limited. It may be installed on the LTE network 21 side and the master server may be installed on the LAN 17 side and the LTE network 21 side, respectively.

When the master server is provided on the LAN 17 side and the LTE network 21 side in the voice communication system, respectively, the overall configuration comprises the configuration on the LAN 17 side in FIG. 13 on both the LAN 17 side and the LTE network 21 side. The communication on the LAN 17 side is conducted by integrating the voice signals to the master server on the LAN 17 side, while the communication on the LTE network 21 side is conducted by integrating the voice signals to the LTE network 21. The communication from the communication terminal 14 on the LAN 17 side to the communication terminal 24 on the LTE network 21 side (transmission/reception of the voice signal) is conducted in the order of the LAN communication terminal 14—LAN slave server—LAN master server—gateway 12—LTE master server—LTE slave server—LTE communication terminal 24, and the communication from the communication terminal 24 on the LTE network 21 side to the communication terminal 14 on the LAN 17 side is conducted in the reverse order. If the communication terminals 14 and 24 are subordinate of the master server, it is not necessary to go through the slave server.

By means of the configuration and procedures described above, according to this embodiment, when a system connecting two networks is to be designed, since the same IP address can be used in the respective networks, free network design can be realized. As a result, although IP addresses in the two networks conventionally needed to be managed collectively, they only need to be managed in the respective networks, whereby convenience is improved.

Moreover, if a new network system is to be connected to an existing network system, the network system can be connected without influencing an address form of the existing network.

Moreover, since the voice signals can be integrated to one master server via the gateway 12 even in the group communication, even in the group communication by a large number of communication terminals, mixing with an echo cancelled can be performed without complicating the communication.

In the embodiment, the example of the network 17 which is a general LAN (such as Ethernet) and the LTE network 21 are connected is illustrated, but the present invention is not limited to that but can be widely applied to a case where a plurality of networks whose local IP addresses are likely to be overlapped are connected. Moreover, a mobile phone network is not limited to the LTE network 21. A 3G network may be used, for example.

REFERENCE NUMERALS

10 LAN-side system
11 LAN server
12 Gateway
14 LAN communication terminal
17 Network (LAN)
20 LTE-side system
21 LTE network
22 LTE server
24 LTE communication terminal

What is claimed is:

1. A gateway device for connecting a first network and a second network each having an address space at least partially overlapped with each other, a first server is connected to the first network, and a second server is connected to the second network, and each of the first and second servers transmits/receives a voice signal to/from at least one subordinate communication terminal in communication therewith, the gateway device comprising:
   a first protocol stack for managing a transmission/reception address of a communication packet of the voice signal on the first network;
   a second protocol stack for managing a transmission/reception address of a communication packet of the voice signal on the second network; and
   a call control unit for determining, when the communication packet of the voice signal is received from the first server or the second server, a forwarding destination network and a forwarding destination address of a payload included in the communication packet on a basis of call destination information included in the communication packet, wherein
   the call control unit operates in one of a master mode or a slave mode for interacting with the first server and/or the second server that
   when the call control unit operates in the master mode, the first and second servers operate in the slave mode for interacting with the call control unit, and when the call control unit operates in the slave mode, one server among the first and second servers operates in the master mode for interacting with the call control unit and the first and second servers other than the one server,
   wherein the call control unit in the master mode determines a reaching point of the voice signal to transfer the voice signal to the first and second servers in the slave mode, and
   wherein the call control unit in the slave mode transmits the communication packet of the voice signal received from the first server or the second server in the slave mode to the one server in the master mode.

2. A voice communication system comprising:
   the gateway device according to claim 1;
   the first server connected to the first network; and
   the second server connected to the second network having the address space at least partially overlapped with the address space of the first network, wherein
   each of the first and second servers transmits/receives the voice signal to/from at least one subordinate communication terminal,
   each of the first and second servers transmits the voice signal received from the at least one subordinate communication terminal to the gateway device and transmits the voice signal received from the gateway device to the at least one subordinate communication terminal,
   the gateway device is set to the master mode for interacting with both of the first and second servers.

3. A voice communication system comprising:
   the gateway device according to claim 1;
   the first server connected to the first network, the first server comprising a plurality of first servers; and
   the second server connected to the second network, the second server comprising a plurality of second servers, the second network having the address space at least partially overlapped with the address space of the first network, wherein
   each of the plurality of first and second servers transmits/receives the voice signal to/from a plurality of subordinate communication terminals,
   one of the plurality of first servers of the first network is set as a first master server, while an other one of the plurality of first servers of the first network is set as a first slave server, and the plurality of second servers of the second network are set as a plurality of second slave servers,
   the gateway device is set to the slave mode for interacting with the first network and to the master mode for interacting with the second network,
   the first master server receives the voice signal from the first slave server or the second slave server, and determines a reaching point of the voice signal to transfer the voice signal to the first and second slave servers and the gateway device,
   the first slave server transmits the voice signal received from one of the plurality of subordinate communication terminals of the first network to the first master server using the communication packet and transmits the voice signal received from the first master server to another one of the plurality of subordinate communication terminals of the first network,
   the plurality of second slave servers transmit the voice signal received from one of the plurality of subordinate communication terminals in communication therewith to the gateway device by using the communication packet, and transfer the voice signal to another one of the plurality of subordinate communication terminals in communication therewith,
   the plurality of second slave servers transfer the voice signal received from the gateway device to the plurality of subordinate communication terminals in communication therewith,
   the gateway device transmits the voice signal received from the first master server to the plurality of second slave servers and transmits the voice signal received from one of the plurality of second slave servers to the first master server.

4. A voice communication system comprising:
   the gateway device according to claim 1;
   the first server connected to the first network; and
   the second server connected to the second network having the address space at least partially overlapped with the address space of the first network, wherein
   each of the first and second servers transmits/receives the voice signal to/from a plurality of subordinate communication terminals in communication therewith, wherein the gateway device is set to the master mode, while the first and second servers are set to the slave mode in a group communication, the group communication is a mode of conducting communication mutually by three or more communication terminals belonging to a group at a same time, the first and second servers in the slave mode transfer the voice signal received from one of the plurality of subordinate communication terminals belonging to the group to another one of the plurality of subordinate communication terminals belonging to the group and to the gateway device in the master mode, and transfers the voice signal received from the gateway device in the master mode to the plurality of subordinate communication terminals belonging to the group, and the gateway device in the master mode transmits the voice signal received from the first and second servers in the slave mode to a server managing the communication terminal belonging to the group.

5. A voice communication system comprising:
the gateway device according to claim 1;
the first server connected to the first network, the first server comprising a plurality of first servers; and
the second server connected to the second network, the second server comprising a plurality of second servers, the second network having the address space at least partially overlapped with the address space of the first network, wherein each of the plurality of first and second servers transmits/receives the voice signal to/from a plurality of the subordinate communication terminals, wherein one of the plurality of first servers of the first network is set as a first master server, while at least two of remaining ones of the plurality of first servers of the first network are set as first slave servers, and the plurality of second servers of the second network are set as second slave servers, the gateway device is set to the slave mode for interacting with the first network and to the master mode for interacting with the second network in a group communication, the group communication is a mode conducting communication mutually by three or more terminals belonging to a group at a same time, the at least two first slave servers transfer the voice signal received from one of the plurality of subordinate communication terminals belonging to the group to remaining of the plurality of subordinate communication terminals belonging to the group and to the first master server, the at least two first slave servers transfer the voice signal received from the first master server to the plurality of subordinate communication terminals belonging to the group, the first master server transfers the voice signal received from one of the plurality of subordinate communication terminals belonging to the group to another one of the plurality of subordinate communication terminals belonging to the group and to the at least two first slave servers managing the plurality of subordinate communication terminals belonging to the group, the first master server transfers the voice signal received from one of the at least two first slave servers to remaining of the at least two first slave servers managing the plurality of subordinate communication terminals belonging to the group and to the plurality of subordinate communication terminals belonging to the group, the first master server transmits the voice signal to the gateway device when the plurality of subordinate communication terminals belonging to the group are on the second network, the second slave servers transfer the voice signal received from one of the plurality of subordinate communication terminals to remaining of the plurality of subordinate communication terminals belonging to the group and to the gateway device, the second slave servers transfer the voice signal received from the gateway device to the plurality of subordinate communication terminals belonging to the group, the gateway device transmits the voice signal received from the first master server to the second slave servers managing the plurality of subordinate communication terminals belonging to the group, and the gateway device transmits the voice signal received from one of the second slave servers to remaining of the second slave server managing the plurality of subordinate communication terminals belonging to the group and to the first master server.

6. A voice communication system comprising:
the gateway device according to claim 1;
the first server connected to the first network, the first server comprising a plurality of first servers; and
the second server connected to the second network, the second server comprising a plurality of second servers, the second network having an address space at least partially overlapped with the address space of the first network, wherein each of the plurality of first and second servers transmits/receives the voice signal to/from a plurality of subordinate communication terminals, one of the plurality of first servers of the first network is set as a first master server, while at least two of remaining ones of the plurality of first servers of the first network are set as first slave servers, one of the plurality of second servers of the second network is set as a second master server, while at least two of remaining ones of the plurality of second servers of the second network are set as second slave servers in a group communication, the group communication is a mode of conducting communication mutually by three or more communication terminals belonging to a group at a same time, the at least two first slave servers transfer the voice signal received from one of the plurality of subordinate communication terminals belonging to the group to the plurality of subordinate communication terminals belonging to the group and to the first master server, the at least two first slave servers transfer the voice signal received from the first master server to the plurality of subordinate communication terminals belonging to the group, the first master server transfers the voice signal received from one of the plurality of subordinate communication terminals belonging to the group to remaining of the plurality of subordinate communication terminals belonging to the group and to remaining of the at least two first slave servers managing the plurality of subordinate communication terminals belonging to the group, the first master server transfers the voice signal received from one of the at least two first slave servers to remaining of the at least two first slave servers managing the plurality of subordinate communication terminals belonging to the group and to the plurality of subordinate communication terminals belonging to the group, the first master server transmits the voice signal to the gateway device when the plurality of subordinate communication terminals belonging to the group are on the second network, the at least two second slave servers transfer the voice signal received from one of the plurality of subordinate communication terminals belonging to the group to remaining of the plurality of subordinate communication terminals belonging to the group and to the second master server, the at least two second slave servers transfer the voice signal received from the second master server to the plurality of subordinate communication terminal belonging to the group, the second master server transfers the voice signal received from one of the plurality of subordinate communication terminals belonging to the group to remaining of the plurality of subordinate communication terminals belonging to the group and to the at least two second slave servers managing the plurality of subordinate communication terminals belonging to the group, the second master server transfers the voice signal received from one of the at least two second slave servers to the at least two second slave servers managing the plurality of subordinate communication terminals belonging to the group and to the plurality of subordinate communication terminals belonging to the group, the second master server transmits the voice signal to the gateway device when the plurality of subordinate communication terminals belonging to the group are on the first network, and the gateway device is set to the slave mode for interacting with both of the first and second networks so as to transmit the voice signal received from the first master server to the second master server and transmit the voice signal received from the second master server to the first master server.

7. A gateway device for connecting a first network and a second network each having an address space at least partially overlapped with each other, a first server is connected to the first network, and a second server is connected to the second network, and each of the first and second servers transmits/receives a voice signal to/from at least one subordinate communication terminal in communication therewith, the gateway device comprising:

a first interface connected to the first network;
a second interface connected to the second network; and
a call control unit comprising a call destination table including identification information of terminals present on the first and second networks and the call destination table associated with addresses for transmitting a communication packet of the voice signal to the terminals, and determining, when the communication packet of the voice signal is received from the first interface or the second interface, a forwarding destination network and a forwarding destination address of a payload included in the communication packet on a basis of call destination information including identification information included in the communication packet, wherein the call control unit operates in one of a master mode or a slave mode for interacting with the first server and/or the second server that when the call control unit operates in the master mode, the first and second servers operate in the slave mode for interacting with the call control unit, and when the call control unit operates in the slave mode, one server among the first and second servers operates in the master mode for interacting with the call control unit and the first and second servers other than the one server, wherein the call control unit in the master mode determines a reaching point of the voice signal to transfer the voice signal to the first and second servers in the slave mode, and wherein the call control unit in the slave mode transmits the communication packet of the voice signal received from the first server or the second server in the slave mode to the one server in the master mode.

8. A voice communication system comprising:
the gateway device according to claim 7;
the first server connected to the first network; and
the second server connected to the second network having the address space at least partially overlapped with the address space of the first network, wherein each of the first and second servers transmits/receives the voice signal to/from the at least one subordinate communication terminal, each of the first and second servers transmits the voice signal received from the at least one subordinate communication terminal to the gateway device and transmits the voice signal received from the gateway device to the at least one subordinate communication terminal, the gateway device is set to the master mode for interacting with both of the first and second servers.

9. A voice communication system comprising:
the gateway device according to claim 7;
the first server connected to the first network, the first server comprising a plurality of first servers; and
the second server connected to the second network, the second server comprising a plurality of second servers, the second network having the address space at least partially overlapped with the address space of the first network, wherein each of the plurality of first and second servers transmits/receives the voice signal to/from a plurality of subordinate communication terminals, one of the plurality of first servers of the first network is set as a first master server, while an other one of the plurality of first servers of the first network is set as a first slave server, and the plurality of second servers of the second network are set as a plurality of second slave servers, the gateway device is set to the slave mode for interacting with the first network and to the master mode for interacting with the second network, the first master server receives the voice signal from the first slave server or the second slave server, and determines a reaching point of the voice signal to transfer the voice signal to the first and second slave servers and the gateway device, the first slave server transmits the voice signal received from one of the plurality of subordinate communication terminals of the first network to the first master server using the communication packet and transmits the voice signal received from the first master server to another one of the plurality of subordinate communication terminals of the first network, the plurality of second slave servers transmit the voice signal received from one of the plurality of subordinate communication terminals in communication therewith to the gateway device by using the communication packet, and transfer the voice signal to another one of the plurality of subordinate communication terminals in communication therewith, the plurality of second slave servers transfer the voice signal received from the gateway device to the plurality of subordinate communication terminals in communication therewith, the gateway device transmits the voice signal received from the first master server to the plurality of second slave servers and transmits the voice signal received from one of the plurality of second slave servers to the first master server.

10. A voice communication system comprising:

the gateway device according to claim 7;

the first server connected to the first network; and the second server connected to the second network having the address space at least partially overlapped with the address space of the first network, wherein each of the first and second servers transmits/receives the voice signal to/from a plurality of subordinate communication terminals, wherein the gateway device is set to the master mode, while the first and second servers are set to the slave mode in a group communication, the group communication is a mode of conducting communication mutually by three or more communication terminals belonging to a group at a same time, the first and second servers in the slave mode transfer the voice signal received from one of the plurality of subordinate communication terminals belonging to the group to remaining of the plurality of subordinate communication terminals belonging to the group and to the gateway device in the master mode, and transfers the voice signal received from the gateway device in the master mode to the plurality of subordinate communication terminals belonging to the group, and the gateway device in the master mode transmits the voice signal received from the first and second servers in the slave mode to a server managing the communication terminal belonging to the group.

11. A voice communication system comprising:

the gateway device according to claim 7;

the first server connected to the first network, the first server comprising a plurality of first servers; and the second server connected to the second network, the second server comprising a plurality of second servers, the second network having the address space at least partially overlapped with the address space of the first network, wherein each of the plurality of first and second servers transmits/receives the voice signal to/from a plurality of the subordinate communication terminals, wherein one of the plurality of first servers of the first network is set as a first master server, while at least two of remaining ones of the plurality of first servers of the first network are set as first slave servers, and the plurality of second servers of the second network are set as second slave servers, the gateway device is set to the slave mode for interacting with the first network and to the master mode for interacting with the second network in a group communication, the group communication is a mode of conducting communication mutually by three or more terminals belonging to a group at a same time, the at least two first slave servers transfer the voice signal received from one of the plurality of subordinate communication terminals belonging to the group to another one of the plurality of subordinate communication terminals belonging to the group and to the first master server, the at least two first slave servers transfer the voice signal received from the first master server to the plurality of subordinate communication terminals belonging to the group, the first master server transfers the voice signal received from one of the plurality of subordinate communication terminals belonging to the group to another one of the plurality of subordinate communication terminals belonging to the group and to the at least two first slave servers managing the plurality of subordinate communication terminals belonging to the group, the first master server transfers the voice signal received from one of the at least two first slave servers to remaining of the at least two first slave servers managing the plurality of subordinate communication terminals belonging to the group and to the plurality of subordinate communication terminals belonging to the group, the first master server transmits the voice signal to the gateway device when the plurality of subordinate communication terminals belonging to the group are on the second network, the second slave servers transfer the voice signal received from one of the plurality of subordinate communication terminals to remaining of the plurality of subordinate communication terminals belonging to the group and to the gateway device, the second slave servers transfer the voice signal received from the gateway device to the plurality of subordinate communication terminals belonging to the group, the gateway device transmits the voice signal received from the first master server to one of the second slave servers managing the plurality of subordinate communication terminals belonging to the group, and the gateway device transmits the voice signal received from one of the second slave servers to remaining of the second slave servers managing the plurality of subordinate communication terminals belonging to the group and to the first master server.

12. A voice communication system comprising:

the gateway device according to claim 7;

the first server connected to the first network, the first server comprising a plurality of first servers; and the second server connected to the second network, the second server comprising a plurality of second servers, the second network having the address space at least partially overlapped the address space of with the first network, wherein each of the plurality of first and second servers transmits/receives the voice signal to/from a plurality of subordinate communication terminals, one of the plurality of first servers of the first network is set as a first master server, while at least two of remaining ones of the plurality of first servers of the first network are set as first slave servers, one of the plurality of second servers of the second network is set as a second master server, while at least two of remaining ones of the plurality of second servers of the second network are set as second slave servers in a group communication, the group communication is a mode of conducting communication mutually by three or more communication terminals belonging to a group at a same time, the at least two first slave servers transfer the voice signal received from one of the plurality of subordinate communication terminals belonging to the group to the plurality of subordinate communication terminals belonging to the group and to the first master server, the at least two first slave servers transfer the voice signal received from the first master server to the plurality of subordinate communication terminals belonging to the group, the first master server transfers the voice signal received from one of the plurality of subordinate communication terminals belonging to the group to remaining of the plurality of subordinate communication terminals belonging to the group and to the at least two first slave servers managing the communication terminal belonging to the group, the first master server transfers the voice signal received from one of the at least two first slave servers to the at least two first slave servers managing the plurality of subordinate communication terminals belonging to the group and to the plurality of subordinate communication terminals belonging to the group, the first master server transmits the voice signal to the gateway device when the plurality of subordinate communication terminals belonging to the group are on the second network, the at least two second slave servers transfer the voice signal received from one of the plurality of subordinate communication terminals belonging to the group to remaining of the plurality of subordinate communication terminals belonging to the group and to the second master server, the at least two second slave servers transfer the voice signal received from the second master server to the plurality of subordinate communication terminals belonging to the group, the second master server transfers the voice signal received from one of the plurality of subordinate communication terminals belonging to the group to remaining of the plurality of subordinate communication terminals belonging to the group and to the at least two second slave servers managing the plurality of subordinate communication terminals belonging to the group, the second master server transfers the voice signal received from one of the at least two second slave servers to the at least two second slave servers managing the plurality of subordinate communication terminals belonging to the group and to the plurality of subordinate communication terminals belonging to the group, the second master server transmits the voice signal to the gateway device when the plurality of subordinate communication terminals belonging to the group are on the first network, and the gateway device is set to the slave mode for interacting with both of the first and second networks so as to transmit the voice signal received from the first master server to the second master server and transmit the voice signal received from the second master server to the first master server.

* * * * *